US007020253B2

(12) United States Patent
Verbil et al.

(10) Patent No.: US 7,020,253 B2
(45) Date of Patent: Mar. 28, 2006

(54) CALL QUEUING UTILIZATION REPORTING

(75) Inventors: John M. Verbil, Scottsdale, AZ (US);
Robert Eric Pflum, Phoenix, AZ (US)

(73) Assignee: Qwest Communications INternational Inc., Denver, CO (US)

(*) Notice: Subject to any disclaimer, the term of this patent is extended or adjusted under 35 U.S.C. 154(b) by 708 days.

(21) Appl. No.: 09/802,070

(22) Filed: Mar. 8, 2001

(65) Prior Publication Data

US 2001/0012291 A1    Aug. 9, 2001

Related U.S. Application Data

(63) Continuation-in-part of application No. 09/159,940, filed on Sep. 24, 1998, which is a continuation of application No. 08/806,973, filed on Feb. 26, 1997, now Pat. No. 5,844,896.

(51) Int. Cl.
*H04M 15/00* (2006.01)
*H04M 3/42* (2006.01)
*H04M 3/00* (2006.01)

(52) U.S. Cl. .......................... 379/112.01; 379/211.02; 379/221.08; 379/221.11; 379/265.03; 379/265.11; 379/266.01

(58) Field of Classification Search ........... 379/110.01, 379/111, 112.01, 112.06, 112.07, 112.08, 379/265.01, 265.02, 265.09, 266.01, 266.02, 379/266.03, 266.04, 266.06, 221.01, 221.02, 379/221.08, 221.11, 265.03, 265.11
See application file for complete search history.

(56) References Cited

U.S. PATENT DOCUMENTS

| | | | | |
|---|---|---|---|---|
| 4,788,718 A | * | 11/1988 | McNabb et al. | 379/112.08 |
| 5,440,623 A | | 8/1995 | Moore et al. | |
| 5,530,744 A | * | 6/1996 | Charalambous et al. | 379/266.08 |
| 5,610,912 A | | 3/1997 | Johnston | |
| 5,633,924 A | | 5/1997 | Kaish et al. | |
| 5,652,790 A | | 7/1997 | Andruska et al. | |
| 5,696,809 A | | 12/1997 | Voit | |
| 5,701,301 A | | 12/1997 | Weisser, Jr. | |
| 5,740,234 A | * | 4/1998 | Black et al. | 379/112.01 |
| 5,754,634 A | * | 5/1998 | Kay et al. | 379/112.01 |
| 5,799,073 A | * | 8/1998 | Fleischer et al. | 379/112.01 |
| 5,844,896 A | | 12/1998 | Marks et al. | |
| 5,864,616 A | * | 1/1999 | Hartmeier | 379/265.03 |
| 6,011,838 A | * | 1/2000 | Cox | 379/112.06 |
| 6,212,261 B1 | * | 4/2001 | Meubus et al. | 379/88.12 |
| 6,289,094 B1 | * | 9/2001 | Miloslavsky | 379/220.01 |
| 2001/0024495 A1 | * | 9/2001 | Verbil et al. | 379/215.01 |

* cited by examiner

*Primary Examiner*—Binh K. Tieu
(74) *Attorney, Agent, or Firm*—Brooks Kushman P.C.

(57) ABSTRACT

Call queuing is implemented in a telecommunications advanced intelligent network. After a call to a busy subscriber line is queued, information about the queued call is collected. Utilization statistics based on the collected queue utilization information are then generated and made available to the subscriber.

9 Claims, 5 Drawing Sheets

CALL QUEUING UTILIZATION REPORTING

CROSS-REFERENCE TO RELATED APPLICATIONS

This application is a continuation-in-part of U.S. application Ser. No. 09/159,940, filed Sep. 24, 1998, which, in turn, is a continuation of application Ser. No. 08/806,973, filed Feb. 26, 1997, now U.S. Pat. No. 5,844,896, filed Feb. 26, 1997, each of which is incorporated by reference herein.

BACKGROUND OF THE INVENTION

1. Field of the Invention

This invention relates to telecommunications network-based call queuing operations.

2. Background Art

For businesses that receive many phone calls per day, it is common for a telephone company to provide such subscribers with more than a single incoming telephone line on which to receive calls. These multiple lines are commonly configured as a hunt group. The hunt group has a telephone number associated with it which, when dialed, causes a telephone routing system to attempt to connect the call to each of the incoming telephone lines until an idle line is found.

Many businesses also subscribe to voice messaging or queuing services provided by their telephone company. In such systems, if all the telephone lines in the hunt group are busy or go unanswered, the voice messaging system (VMS) generates a computer-activated message instructing the caller to leave a message. The message is then recorded by the voice messaging system and is stored in a computer, thereby allowing subscribers to listen to the recorded messages and call back the customers who were unable to get through. With queuing services, if all the telephone lines in the hunt group are busy, a computer-activated message is similarly generated instructing the caller that all operators are currently busy, and that the call will be answered in the order received.

While the above call handling features have worked well for the majority of call handling situations, they have their drawbacks. Namely, neither feature allows a caller to choose whether to leave a message or to remain on the line while a call is answered. One solution overcomes this problem through use of a switch-based approach. For example, programmable central office switches may provide prioritized features to a telephone number including queuing, Call Forward Don't Answer to the voice messaging system, and Call Forward Busy Line to the voice messaging system. The routing system typically includes a set of incoming telephone lines that are configured as a multi-line hunt group having a Hunt Group Directory Number associated with it. The Hunt Group Directory Number has queuing, Call Forward Line to the VMS and Call Forward Don't Answer to the VMS features enabled. The multi-line hunt group has further associated with it a set of individual hunt group telephone numbers that are matched to each of the incoming telephone lines. Each individual hunt group telephone number has the features Call Forward Busy Line to the VMS and Call Forward Don't Answer to the VMS enabled, but does not have a queuing feature enabled.

While a switch-based approach combines queuing and voice messaging features with existing telephone switching and voice messaging hardware, it does so at a cost which has limited its use to larger business customers. Moreover, because the approach is switch based, it is inapplicable to next generation network system, namely an Advanced Intelligent Network (AIN).

Consequently, a need exists for a system and method which permits residential customers and small to medium sized business customers the ability to place incoming calls in a queue when all of their lines are busy for later retrieval. Such a system and method should obviate the need for a subscriber to purchase telephone lines equivalent to the maximum queue size as well as the hardware needed to provide such queuing function. Subscribers should not be required to purchase any additional telephone lines or hardware to provide the required queuing function. Further, queues should be managed so as to provide subscribers with information about how queues are being utilized.

SUMMARY OF THE INVENTION

The present invention collects information about each call, aggregates this information and provides the subscriber with call queuing utilization reports based on the aggregated data.

A method of call queuing utilization reporting implemented in a telecommunications advanced intelligent network is provided. A plurality of calls to access a subscriber line are received. Each call is placed in a queue associated with the subscriber line if the subscriber line is busy. The queue is implemented within the telecommunications network. Queue utilization information is collected about each queued call. Queue utilization statistics are generated based on the collected queue utilization information.

In an embodiment of the present invention, subscriber data is aggregated across a plurality of report periods. Calculating utilization information is based on the aggregated data.

Queue utilization information may be accessed by the subscriber in a variety of manners. For example, the queue utilization statistics may be formatted for access by a subscriber over the Internet. The statistics may be electronically mailed to the subscriber or the subscriber may access the information using a variety of tools such as, for example, a web browser. The information may also be mailed to the subscriber. Such mailings can be included, for example, with the monthly billing statement.

A system for reporting utilization of subscriber line call queues is also provided. The system includes a plurality of intelligent peripherals. Each intelligent peripheral implements at least one call queue. Each call queue is associated with one of a plurality of subscribers. Each intelligent peripheral communicates with a service control point collecting information about queued calls. A data server communicates with the service control points to aggregate queue utilization data for each subscriber.

In an embodiment of the present invention, at least one central office switch is in electrical communication with at least one of a plurality of subscriber switches. The intelligent peripheral places a call to the central office switch for receipt by a subscriber having a call placed in queue. The call is placed by the intelligent peripheral in response to a determination that a line associated with a subscriber is idle.

In another embodiment of the present invention, the system includes a data distributor in communication with each service control point and the data server. Each data distributor receives information about queued calls from the service control point and periodically forwards the information to the data server.

In yet another embodiment of the present invention, the system includes a data publishing platform in communication with the data server. The data publishing platform aggregates subscriber queue utilization data across a plurality of report periods. The data publishing platform may further calculate utilization statistics based on the aggregated subscriber utilization data. The data publishing platform may also provide queue utilization reports to a subscriber computer. These subscriber utilization reports may be sent over the Internet through a variety of means such as via electronic mail, in response to a request generated by a web browser, or the like.

A method of reporting utilization of call queues is also provided. Each call is placed from a caller to a subscriber line. The call is processed by an advanced intelligent network (AIN) having at least one central office switch and a service control point (SCP). An intelligent peripheral equipped with queuing functionality is provided. Each of a plurality of calls to access the subscriber line is received. For each call, a determination is made as to whether or not the subscriber line is busy. Each call is queued in the intelligent peripheral if the subscriber line is busy. Queue utilization information is collected in the service control point. Queue utilization statistics are generated based on the collected queue utilization information.

In an embodiment of the present invention, the subscriber line is monitored to notify the SCP when the line is idle. A call is placed from the intelligent peripheral to the subscriber in response to a determination that the subscriber line is idle. Answer supervision is forwarded to the intelligent peripheral in response to the call from the intelligent peripheral being answered by the subscriber. The subscriber and the caller are transferred and connected at the central office switch.

In another embodiment of the present invention, call signaling is monitored to detect a termination attempt trigger. A query is launched at the SCP for receipt by the intelligent peripheral requesting the queue status of the subscriber line in response to the detected termination attempt trigger. The call to the intelligent peripheral is forwarded to be added to the queue in response to a determination that the queue is active. The call to the subscriber is delivered and a next event list trigger is set to determine the status of a subscriber line in response to a determination that the queue is empty. The call to the subscriber line is connected in response to a determination that the line is idle. The call to the intelligent peripheral is forwarded to be placed in queue in response to a determination that the subscriber line is busy.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
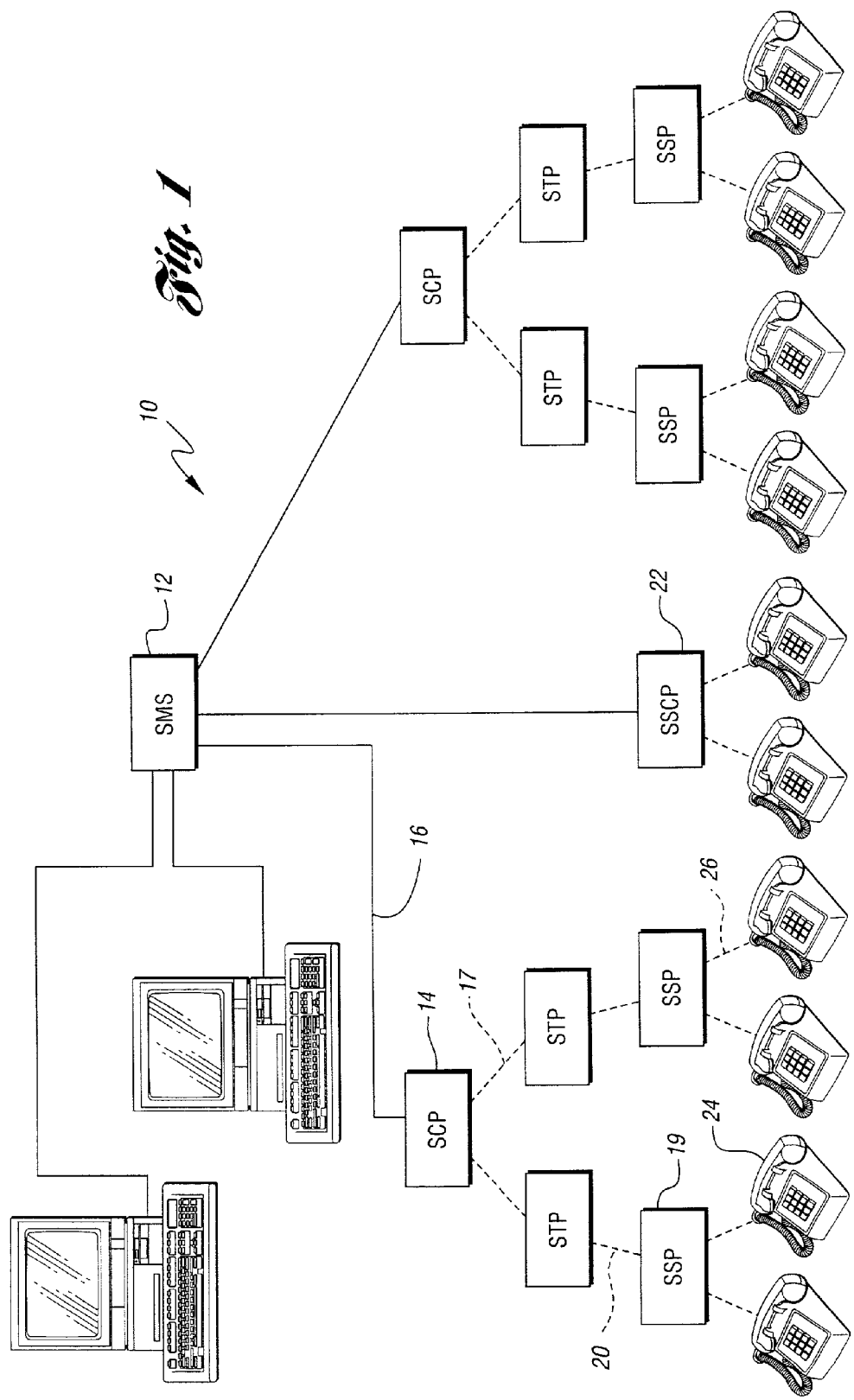
FIG. 1 is a block diagram of a representative Advanced Intelligent Network (AIN)

With reference to FIG. 1 of the drawings, a schematic diagram of a representative Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. SS7 generally operates at 56 kbps and can support variable message lengths up to 2,176 bits (272 octets) of information per message.

As is known in the art, the SS7 network may be comprised of various package switching elements and transmission links, some of which are shown. As seen, there is also provided service management system (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of service control points (SCPs)/adjuncts 14 via wide area network management links 16. Again, as those skilled in the art will recognize, AIN service control points 14 are nodes which contain the service logic and associated data support to execute the required customer services.

Still further, there is provided signal transfer points (STPs) 18 in electrical communication with SCP/adjunct 14 via signaling links 17. Service transfer points 18 are packet switches used to route signaling messages within the network. Service switching points (SSPs) 19 are also provided. Service switching points 19 are generally nodes, usually the subscriber local switch or central office switch, which recognize the triggers generated when a subscriber's service invokes an intelligent network trigger and then communicates with the SCP to operate the service.

As shown, service switching points 19 are provided in electrical communication with signal transfer points 18 via signaling links 20. In limited traffic situations, service switching and control points (SSCPs) 22 may also be provided for combining the functions of the SCP and SSP. Subscribers 24 have at least one customer premises equipment (CPE) device such as a telephone, facsimile machine, voice messaging peripheral, modem, or the like. As shown, CPE devices 24 are provided in electrical communication with service switching points 19 (COS) via telephone lines 26.

The AIN architecture referred to above is known to permit services to be extended throughout the network. In operation, new services are typically installed on two SCP processing platforms for directly servicing a selected market. In operation, this service management system extends management and control to the remote service control points/adjuncts via a signaling network.

Figure 2:
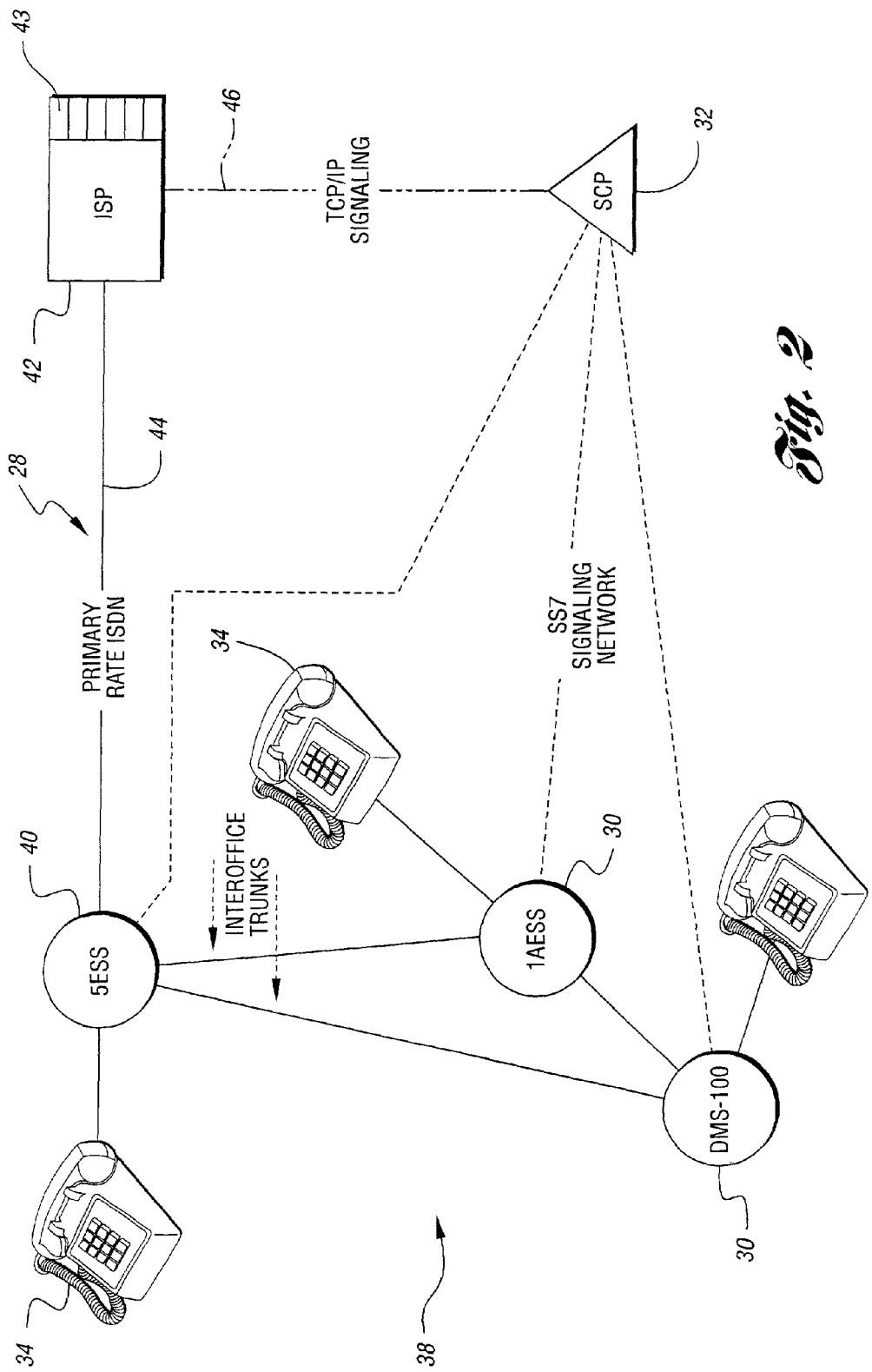
FIG. 2 is a block diagram of a telephone routing system operative to carry out the method of the present invention.

Turning now to FIG. 2, there is shown a schematic diagram of a system used to implement the method of the present invention. The system, which is designated generally by reference numeral 28, includes at least one subscriber switch 30 which is provided in electrical communication with at least one service control point 32 and at least one, preferably a plurality, of subscribers 34 so as to define an Advanced Intelligent Network 38. The Advanced Intelligent Network is equipped with Termination Attempt Trigger and terminating Next Event List functionality, the operation of which is well known to those skilled in the art and therefore need not be discussed here in further detail.

One of the switches 40 in system 28 may be designated as a host central office switch by virtue of the fact that it is provided in electrical communication with an intelligent peripheral (IP) 42 implementing one or more queues 43. The intelligent peripheral 42 is preferably, but not necessarily, a Bellcore Intelligent Services Peripheral which is provided in electrical communication with the host central office switch 40 via Primary Rate Integrated Services Digital Network (ISDN) links 44 and further provided in electrical communication with SCP 32 via TCP/IP (wide area network) signaling 46. In further keeping with the invention, each of the subscribers 34 maintains a dedicated and preferably, but not necessarily, subscriber programmable number of queuing slots within intelligent peripheral 42.

Figure 3:
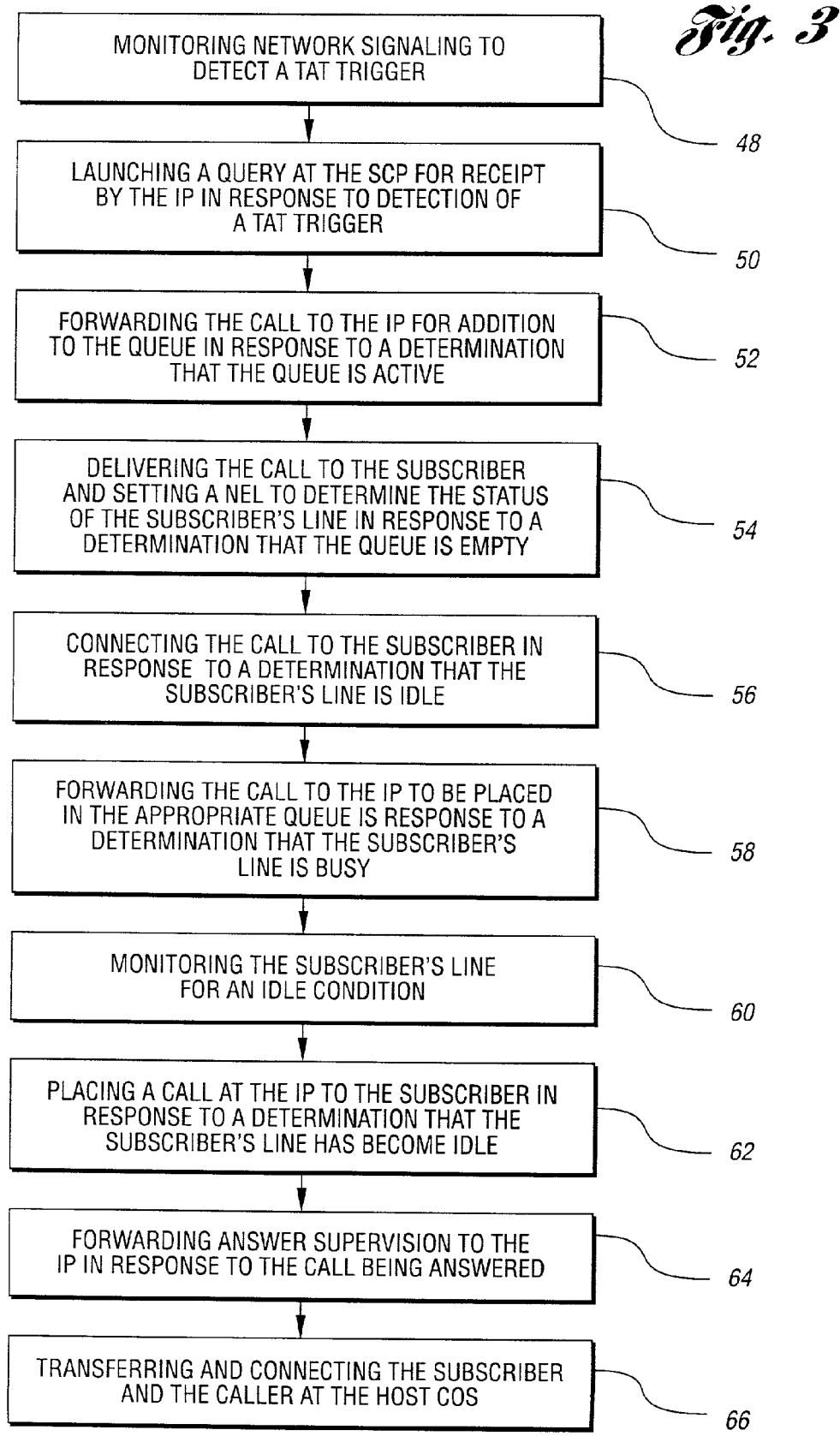
FIG. 3 is a block diagram illustrating the method steps of queuing and connecting a caller and a subscriber according to an embodiment of the present invention.
Figure 4:
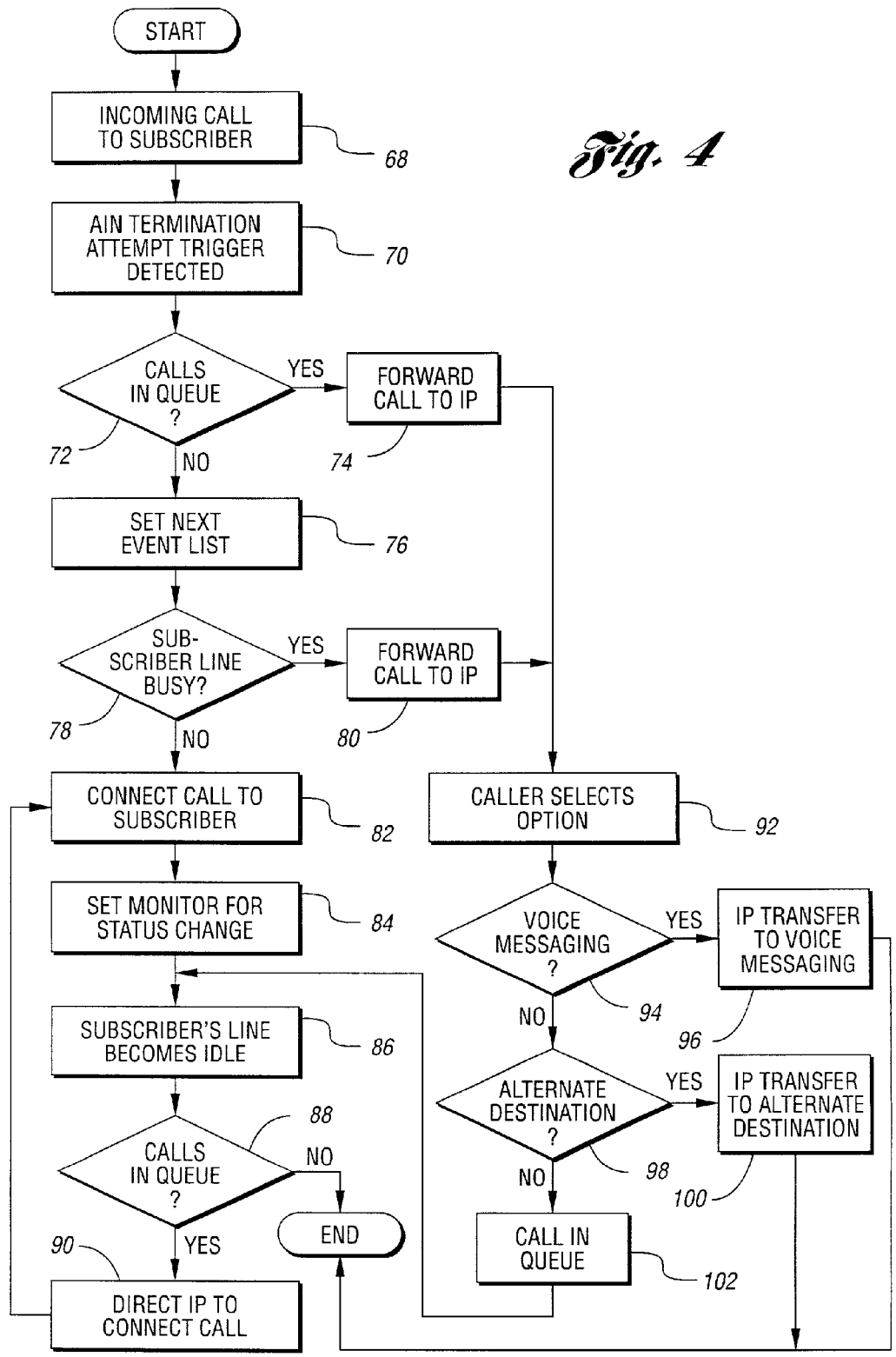
FIG. 4 is a detailed flow diagram illustrating a method for queuing and servicing calls to a subscriber line according to an embodiment of the present invention.

Referring to FIGS. 3 and 4, diagrams illustrating call queuing according to embodiments of the present invention are shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

As discussed above, the method may be implemented in an Advanced Intelligent Network, such as that illustrated in system 28 of FIG. 2, which is equipped with Termination Attempt Trigger (TAT) and Next Event List (NEL) functionality. Queuing system 28 includes intelligent processor 42 equipped with queuing functionality to provide a platform for the present invention.

In operation, network signaling is monitored 48 for detection of a TAT. Upon detection of a TAT, a query is launched 50 at the SCP. The query is launched in response to the detected TAT and is operative to request the queue status of the subscriber line. If, in response to the SCP query, the queue is determined to be active, the call is forwarded 52 to the IP for addition to the queue.

In contrast, if the queue is determined to be empty, the call is delivered 54 to the subscriber and a NEL is set to determine the status of the subscriber line. Of course, if the subscriber line is idle, the call will be connected 56 to the subscriber. Alternatively, if it is determined that the subscriber line is busy, the call will be forwarded 58 to the IP to be placed in the appropriate queue.

The subscriber line is thereafter monitored for an idle condition. If an idle condition is detected, a call is placed from the IP to the subscriber. Upon being answered, answer supervision is forwarded to the IP whereupon the subscriber is connected to the IP and an announcement is played telling the subscriber the number of calls currently stacked (waiting) in queue. The call is then transferred at the host COS where the caller and subscriber are connected.

The above described method may be further understood by reference to the detailed flow diagram of FIG. 4. As shown in block 68, the network attempts to deliver a call to the subscriber. As part of call processing, the network encounters a Termination Attempt Trigger (TAT), as shown in block 70. A check is made at block 72 to determine if the subscriber already has other calls in queue. If there are calls already in queue, the network is directed to forward this call to the IP for further processing, as shown in block 74. If there are no calls in queue, the network is directed to set the Next Event List, as shown in block 76, and attempt to connect to the subscriber line.

If the subscriber line is busy, as shown in block 78, the next event list processing directs the network to forward the call to the IP, as shown in block 80. If the subscriber line is not busy, the network will connect the call to the subscriber, as shown in block 82, and set a monitor on the subscriber line to report when it is idle, as shown in block 84. When the call is completed and the subscriber line becomes idle, as shown in block 86, the network checks to see if there are any calls left in queue, as shown in block 88. If there are no calls in queue for the subscriber, this process ends. If there are other calls in queue, the IP is directed to deliver the call from the queue to the subscriber, as shown in block 90. The process continues from block 82 and repeats as previously described.

Calls that are forwarded to the IP as shown in blocks 74 and 80 are connected and the caller is given a choice of treatments, as shown in block 92. If the caller elects to leave a message, as shown in block 94, the IP forwards the call to a messaging system, as shown in block 96. If the caller elects an alternate destination, as shown in block 98, then the IP forwards the call to that telephone line, as shown in block 100. The caller then can elect to disconnect or to be placed in queue and hold waiting for the subscriber line to become idle, as shown in block 102. Once the subscriber line becomes idle, the process continues from block 86 as previously described.

Thereafter, answer supervision is forwarded to the IP, the subscriber is connected to the IP and an announcement is played telling the subscriber the number of calls currently stacked (waiting in queue). The call is then transferred at the host COS where the caller and subscriber are connected.

Various enhancements and modifications of the above-described method are, of course, contemplated. For example, when a caller attempts to call a subscriber and all lines are busy, the IP may be programmed to state a listed directory name, if recorded, and/or an announcement indicating that all lines are busy. The caller may then be placed into queue and allowed to exit by pressing a designated number such as, for example, "1" on the caller touch tone phone to leave a message, if the subscriber has a messaging number associated with their service. As part of the invention, the IP will then attempt to complete the call and, if successful, the service will end the query and allow the caller and subscriber to maintain their voice connection until terminated by one of the parties.

In the event that the lines are still busy, the caller will remain in queue at the IP. Announcements may, of course, be placed to the caller, indicating that the lines are still busy. The caller will then be provided with the option to exit and leave a message, if the subscriber has a messaging number. Additional calls that are routed to the IP on a busy condition will be placed in order behind existing calls in queue. If a subscriber has a messaging number and the caller presses "1", for example, on a touch tone phone, the caller will be transferred directly to the subscriber messaging service. Once the caller is transferred to the voice messaging system, the call is complete and the IP will allow the caller to remain connected until the call is terminated by the caller or the messaging system or service. The caller can, of course, hang up on the telephone at any time to disconnect the call.

Other anticipated enhancements include subscriber controlled queue slot sizing, music on hold, subscriber recorded announcements, priority queuing, MIS reports which provide the subscriber an indication of how many calls are on hold and how long they are waiting by hour, as well as an indicator tone or visual indication which will alert the subscriber that there are calls holding at the IP.

Figure 5:
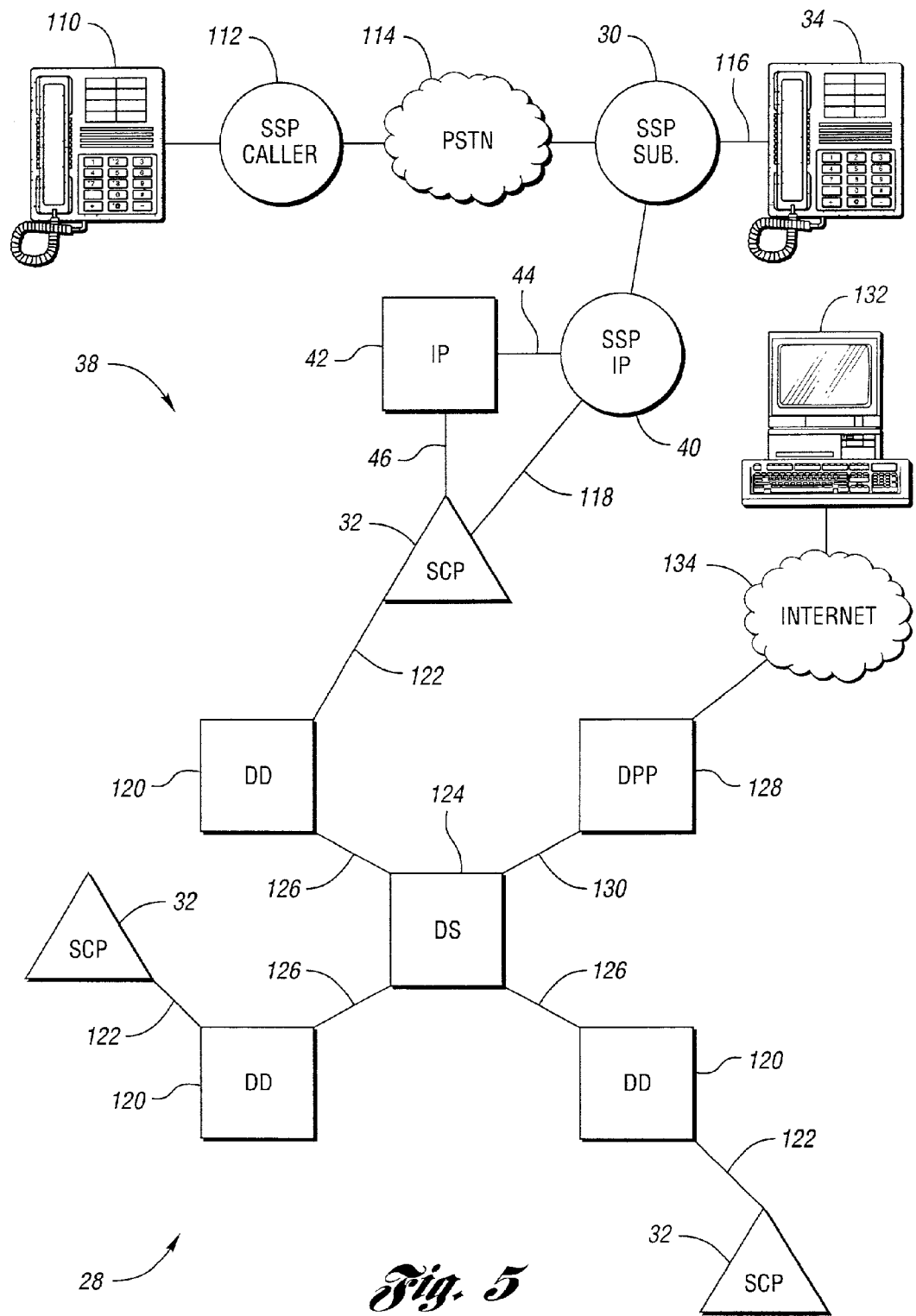
FIG. 5 is a block diagram illustrating a call queuing utilization reporting system according to an embodiment of the present invention.

Referring now to FIG. 5, a block diagram illustrating a call queuing utilization reporting system according to an embodiment of the present invention is shown. A caller, indicated by CPE device 110, accesses queuing system 28 through caller SSP 112. Caller SSP 112 is linked to other central office switches through telecommunications routing network 114. Subscriber 34 receives calls placed by caller 110 through subscriber SSP 30. Intelligent peripheral 42 queues calls placed by caller 110 when one or more subscriber lines 116 are busy or otherwise unavailable. IP 42 is connected to callers 110 and subscribers 34 through IP SSP 40. SCP 32 communicates with switching elements in queuing system 28 through signaling connections, one of which is indicated by 118. Typically, the signaling connections pass through one or more STPs 18, not shown for clarity.

It will be recognized by one of ordinary skill in the art that SSPs 30, 40, 112 are interconnected for calling information through telecommunications routing network 114 and interconnected for signaling information by a Signaling System 7 system, much of the details of which have been omitted for clarity. Further, one or more of SSPs 30, 40, 112 may be implemented as a single SSP, central office, or other switch functionality.

Each SCP 32 may service one or more IPs 42. SCP 32 collects detailed information on each call. SCP 32 maintains an open session for each call handled by IP 42 until the call is resolved, such as by connection with subscriber 34, by abandonment by caller 110, or the like.

Each SCP 32 is supported by a data distributor (DD) 120 which may be implemented, for example, with an IBM Unix-based mini-computer. SCP 32 passes raw call data, either as the data is collected or periodically, through TCP/IP link 122 to data distributor 120. A variety of data items may be collected, including total calls handled by the service, calls not placed in queue due to the service being turned off, calls not placed in queue due to all queue slots being full, calls not placed in queue due to caller abandonment, count and time on hold for calls placed in queue, count and time on hold for queued calls placed in voice mail due to caller request, count and time on hold of queued calls placed in voice mail due to no answer at the subscriber's location, count and time on hold for queued calls that resulted in voice mail for other reasons, count and time on hold for queued calls abandoned by the calling party while on hold, count and time on hold for queued calls eventually connected to the subscriber, and the like. For data where time on hold is captured, various statistics such as call duration, median, mean, standard deviation, and the like may be calculated and reported for each periodic interval.

Periodically, each data distributor 120 forwards data to data server (DS) 124. Data server 124 may be implemented, for example, as an IBM Unix-based work station connected to data distributors 120 by TCP/IP links 126.

Data server 124 aggregates data associated with each subscriber 34. Data server 124 forwards subscriber aggregated data to data publishing platform (DPP) 128. Data publishing platform 128 may be implemented, for example, as an Internet server connected to data server 124 by TCP/IP link 130. Data publishing platform 128 aggregates subscriber data across multiple report periods. Data publishing platform 128 may also calculate additional utilization statistics such as mean and median hold times for all calls placed in queue that were eventually connected to the subscriber, mean and median hold times for calls that ended up in voice mail due to caller request, mean and median hold times for calls that ended up in voice mail due to no answer at subscriber's location, mean and median hold times for calls that ended up in voice mail for other reasons, mean and median hold times for calls that were abandoned by the calling party while on hold, and the like.

Data publishing platform 128 may generate utilization reports in one or more formats to meet the needs of subscribers 34. For example, data publishing platform 128 may format utilization reports to be read by subscriber computer 132. These reports may be sent by electronic mail to subscriber computer 132. If subscriber computer 132 accesses data publishing platform 128 through an interconnecting network such as the Internet 134, they may be accessed on demand by subscriber 34 through the use of an access tool such as, for example, a web browser running on subscriber computer 132. Data publishing platform 128 may also distribute utilization reports to subscriber 34 through the mail. Such reports may be included with monthly billing reports sent to subscriber 34.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of reporting utilization of call queues, each call placed from a caller to a subscriber line, the call processed by an Advanced Intelligent Network (AIN) having at least one central office switch and a service control point (SCP) in electrical communication with a plurality of subscriber switches via a signaling network, the method comprising:

providing an intelligent peripheral in electrical communication with the at least one central office switch and the SCP, the intelligent peripheral equipped with call queuing functionality;

receiving each of a plurality of calls to access the subscriber line;

monitoring call signaling to detect a termination attempt trigger;

launching a query at the SCP for receipt by the intelligent peripheral requesting the queue status of the subscriber line in response to the detected termination attempt trigger;

forwarding the call to the intelligent peripheral to be added to the queue in response to a determination that the queue is active;

delivering the call to the subscriber and setting a next event list trigger to determine the status of a subscriber line in response to a determination that the queue is empty;

connecting the call to the subscriber line in response to a determination that the line is idle;

forwarding the call to the intelligent peripheral to be placed in queue in response to a determination that the subscriber line is busy;

collecting queue utilization information about each queued call in the service control point; and generating queue utilization statistics based on the collected queue utilization information.

2. A method of reporting utilization of call queues in claim 1, the method further comprising:

monitoring the subscriber line to notify the SCP when the line is idle;

placing a call from the intelligent peripheral to the subscriber in response to a determination that the subscriber line is idle;

forwarding answer supervision to the intelligent peripheral in response to the call from the intelligent peripheral being answered by the subscriber; and transferring and connecting the subscriber and the caller at the central office switch.

3. A method of reporting utilization of call queues in claim 1 wherein generating queue utilization statistics is performed by a data server in communication with the service control point.

4. A method of reporting utilization of call queues in claim 3 wherein the data server aggregates information for each of a plurality of subscribers.

5. A method of reporting utilization of call queues in claim 1, the method further comprising formatting the queue utilization statistics for access by a subscriber over the Internet.

6. A method of reporting utilization of call queues in claim 1, the method further comprising sending queue utilization statistics to the subscriber.

7. A method of reporting utilization of call queues in claim 1, the method further comprising:

aggregating subscriber data across a plurality of report periods; and calculating utilization information based on the aggregated data.

8. For use in an Advanced Intelligent Network (AIN) equipped with termination attempt trigger (TAT) capability, the AIN having at least one central office switch and a service control point (SCP) in electrical communication with a plurality of subscriber switches via a signaling network, a method of reporting utilization of queuing of a plurality of telephone calls from a caller to a subscriber telephone line comprising:

providing an intelligent peripheral in electrical communication with the central office switch and the SCP, the intelligent peripheral equipped with queuing functionality for each of the subscribers;

monitoring signaling to detect a TAT;

generating a first electrical signal for receipt by the SCP in response to the detected TAT;

generating a second electrical signal at the SCP for receipt by the intelligent peripheral requesting status of a queue associated with the subscriber line;

generating a third electrical signal at the SCP for receipt by the subscriber switch instructing the subscriber switch to forward the call to the intelligent peripheral to be added to the queue in response to a determination that the queue is active;

determining queue utilization information at the SCP about each queued call; and generating queue utilization statistics based on the queue utilization information generating a fourth electrical signal at the subscriber switch for receipt by the SCP in response to a determination that the subscriber line is busy;

generating a fifth electrical signal at the SCP for receipt by the subscriber switch instructing the subscriber switch to forward the call to the intelligent peripheral to be placed in the queue;

generating a sixth electrical signal at the SCP for receipt by the subscriber switch instructing the subscriber switch to set a monitor on the subscriber line and to notify the SCP when the line is idle;

generating a seventh electrical signal at the subscriber switch for receipt by the SCP in response to a determination that the subscriber line is idle;

generating an eighth electrical signal at the SCP for receipt by the intelligent peripheral instructing the intelligent peripheral to call the subscriber via the central office switch;

generating a ninth electrical signal at the central office switch, for receipt by the intelligent peripheral to forward answer supervision to the intelligent peripheral in response to the call being answered by the subscriber; and generating a tenth electrical signal at the intelligent peripheral for receipt by the central office switch to transfer and connect the subscriber and the caller at the central office switch.

9. The method of claim 8 wherein the AIN is further equipped with Next Event List (NEL) functionality, the method further comprising:

generating an eleventh electrical signal at the SCP for receipt by the subscriber switch instructing the subscriber switch to deliver the call to the subscriber and to set a NEL to determine the status of the subscriber line in response to a determination that the queue is empty; and connecting the call to the subscriber line in response to a determination that the subscriber line is idle.

* * * * *